No. 691,622. Patented Jan. 21, 1902.
J. GREENE.
FILE AND RASP CUTTING MACHINE.
(Application filed Sept. 9, 1901.)
(No Model.) 6 Sheets—Sheet 1.

No. 691,622. Patented Jan. 21, 1902.
J. GREENE.
FILE AND RASP CUTTING MACHINE.
(Application filed Sept. 9, 1901.)
(No Model.) 6 Sheets—Sheet 2.

Attest:
James M. Spear
Edw. L. Reed.

Inventor:
John Greene,
by Eri Spear
Atty.

No. 691,622. Patented Jan. 21, 1902.
J. GREENE.
FILE AND RASP CUTTING MACHINE.
(Application filed Sept. 9, 1901.)

(No Model.) 6 Sheets—Sheet 4.

No. 691,622. Patented Jan. 21, 1902.
J. GREENE.
FILE AND RASP CUTTING MACHINE.
(Application filed Sept. 9, 1901.)
(No Model.) 6 Sheets—Sheet 5.
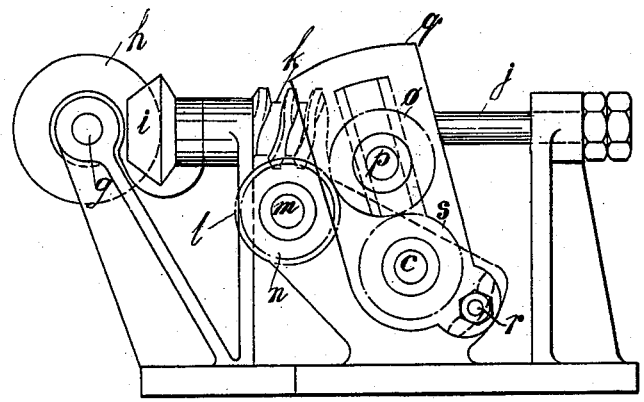
FIG. 6.
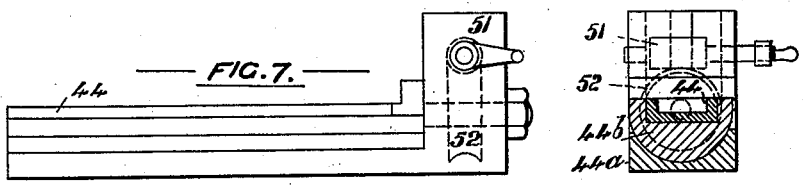
FIG. 7.
FIG. 9.
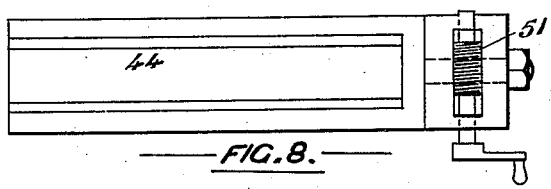
FIG. 8.
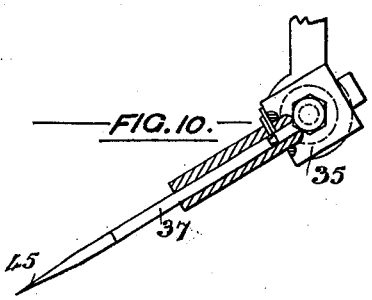
FIG. 10.
Attest:
James M. Ffin
Edw. L. Reed
Inventor:
John Greene
By Ellis Speer
Atty.
THE NORRIS PETERS CO., PHOTO-LITHO., WASHINGTON, D. C.

No. 691,622. Patented Jan. 21, 1902.
J. GREENE.
FILE AND RASP CUTTING MACHINE.
(Application filed Sept. 9, 1901.)
(No Model.) 6 Sheets—Sheet 6.
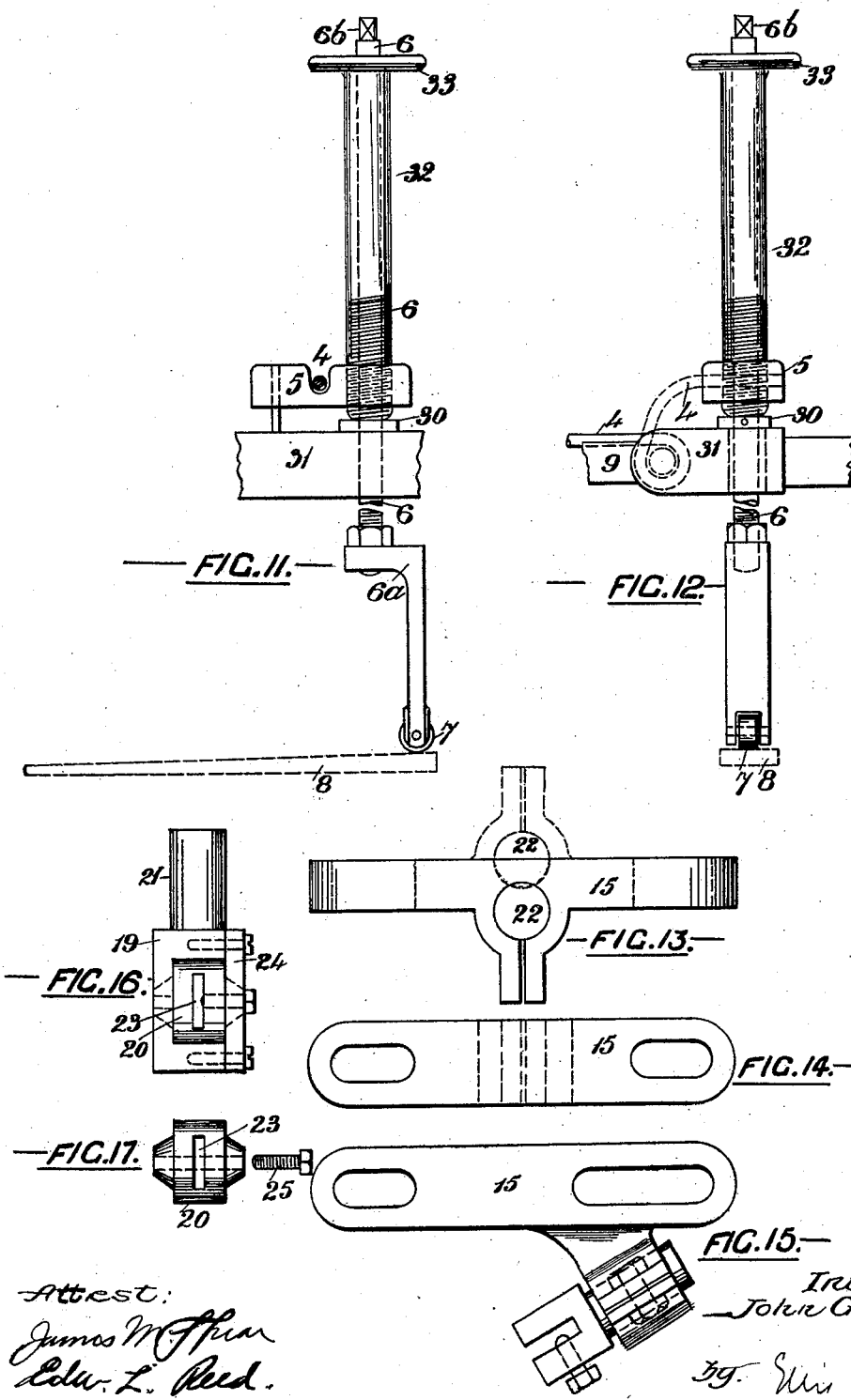

UNITED STATES PATENT OFFICE.

JOHN GREENE, OF WARRINGTON, ENGLAND.

FILE OR RASP CUTTING MACHINE.

SPECIFICATION forming part of Letters Patent No. 691,622, dated January 21, 1902.

Application filed September 9, 1901. Serial No. 74,837. (No model.)

*To all whom it may concern:*

Be it known that I, JOHN GREENE, engineer, a subject of the King of Great Britain and Ireland, residing at Scotland road, Warrington, in the county of Lancaster, England, have invented certain new and useful Improvements in File or Rasp Cutting Machines, (for which I have made application for Letters Patent in Great Britain, No. 5,587, dated the 16th of March, 1901,) of which the following is a specification.

This invention relates to improvements in connection with file-cutting machines, the object being to produce a machine in which the characteristic advantages and appearances arising from hand cutting operations are obtained at a greatly-reduced cost and with an increased output capable of being controlled by ordinary unskilled labor.

Figure 1:
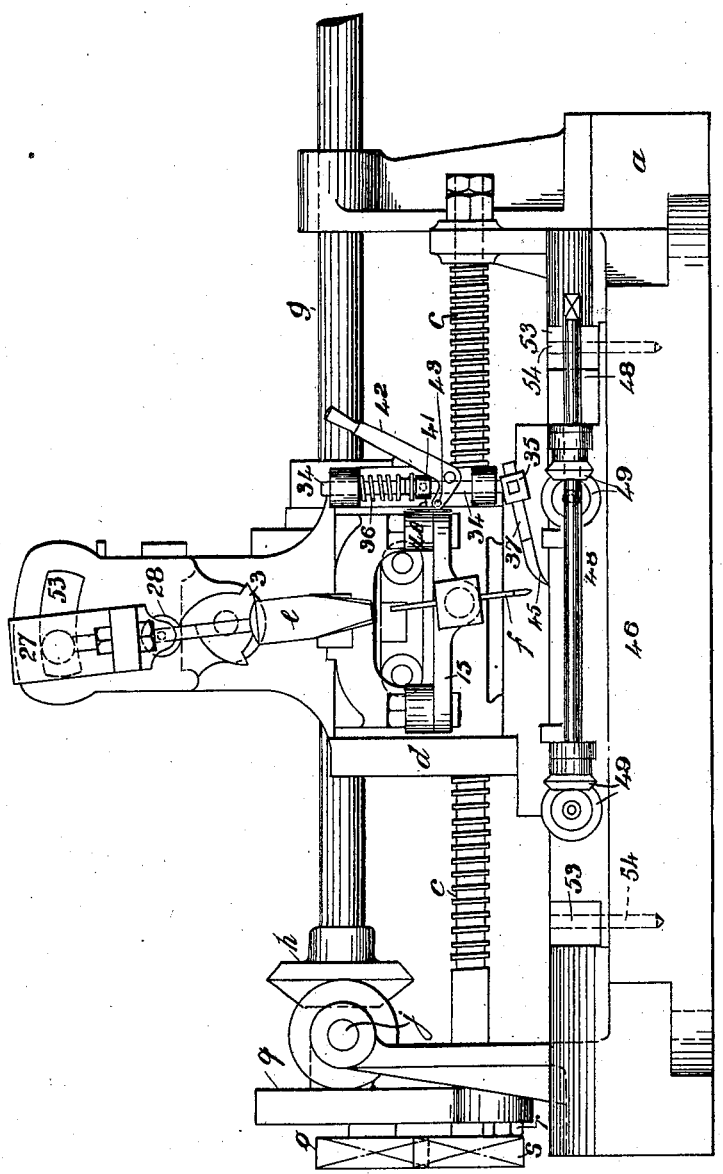
Figure 2:
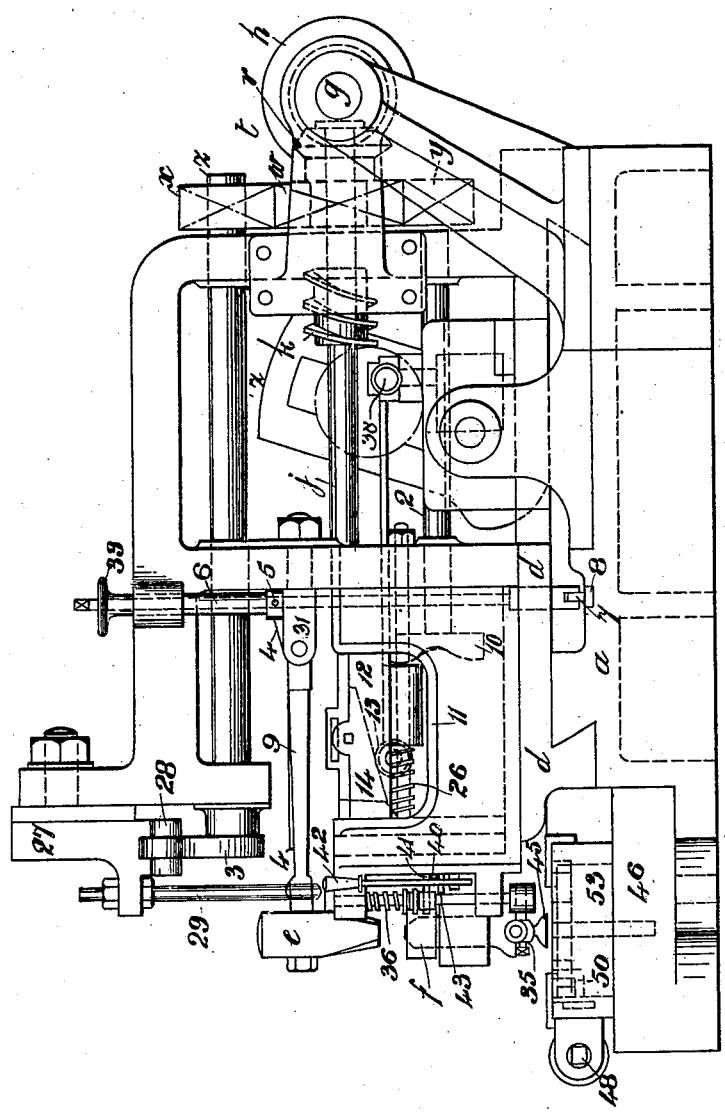
Figure 3:
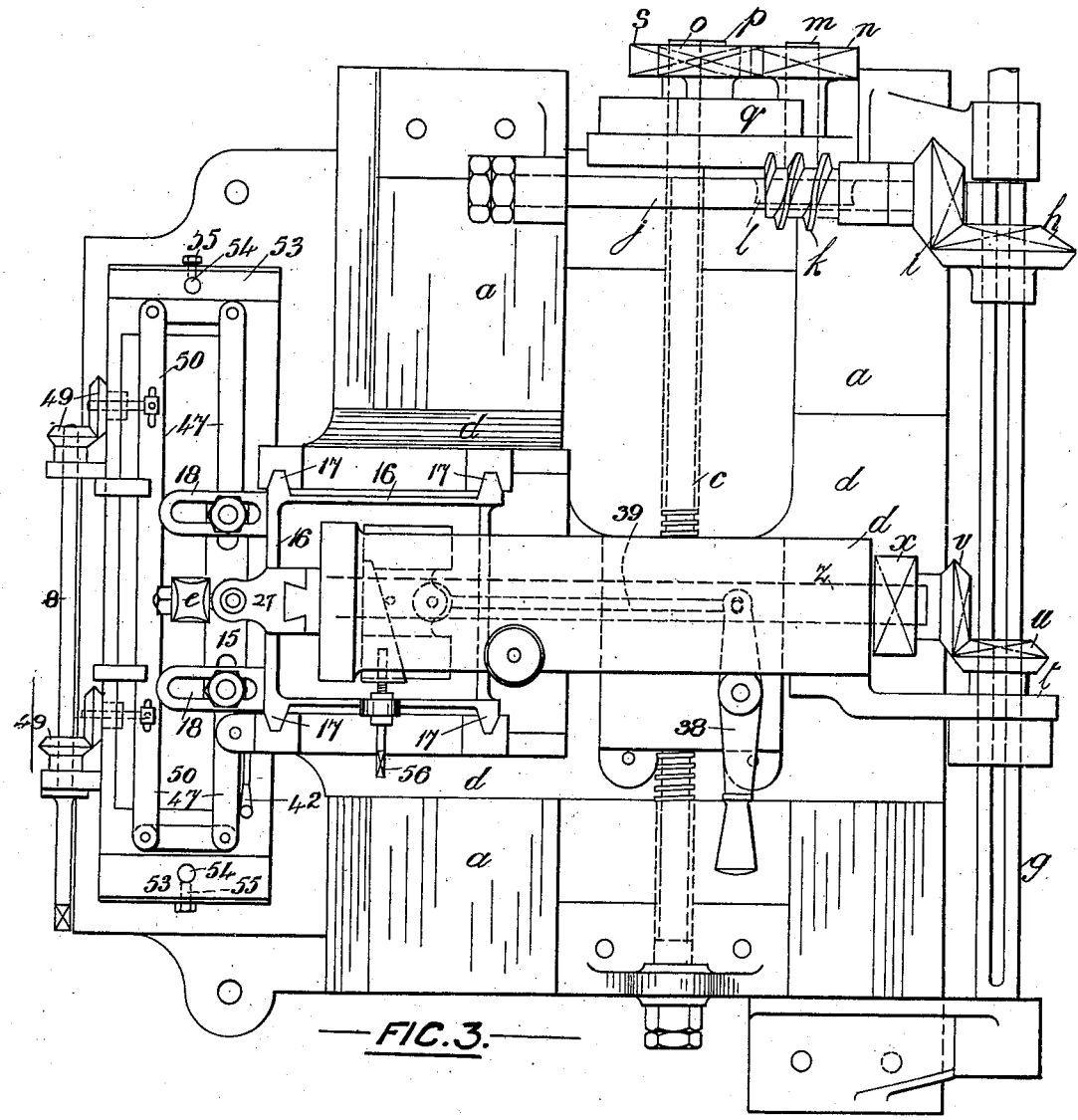
Figure 4:
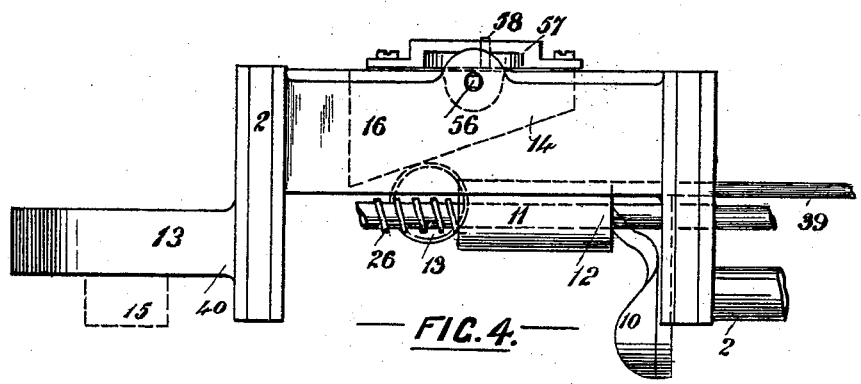
Figure 5:
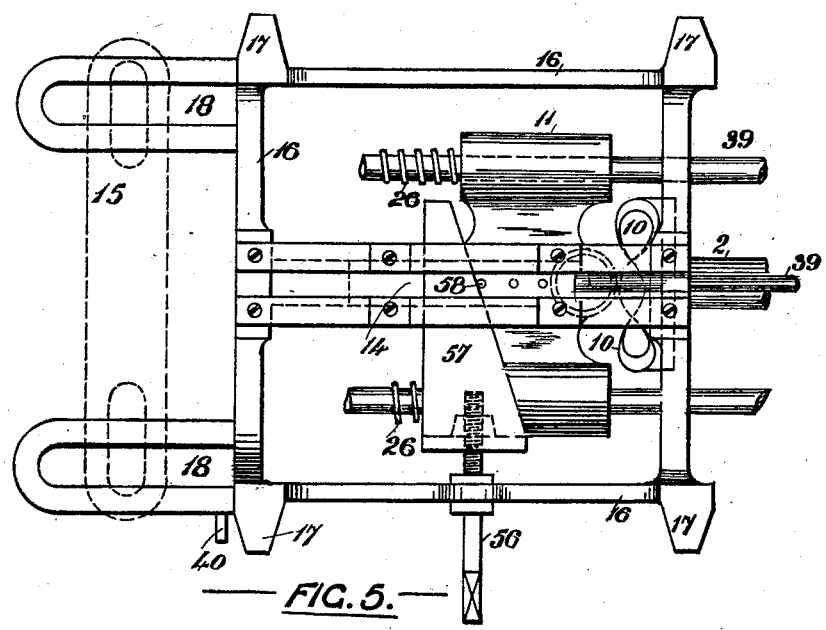

In the accompanying drawings, Figures 1, 2, and 3 are respectively a front elevation, a side elevation, and a plan of a machine constructed according to my invention. Figs. 4 to 17 illustrate in detail several parts thereof.

In carrying my invention into effect I construct my machine in such a manner that the file-holder, together with the file, is kept stationary while the hammer and chisel advance forward. In my machine the hammer strikes the head of the chisel in the same manner as it does in hand-cutting.

On a stationary bed-plate $a$ and in journals fixed to the bed-plate a screw $c$, capable of revolving, but with its ends stationary, is placed. The feed-screw revolves in the thread of a clutch-box which is fitted to the bottom plate of a movable carriage $d$, containing the hammer $e$ and chisel $f$, so that this revolving screw causes the main part of the machinery to traverse along the bed-plate similarly to the carriage of an ordinary lathe.

The main driving-shaft $g$ is placed in bearings on the bed-plate, this shaft having a longitudinal keyway or groove therein. On the end of this main driving-shaft, close to one of the bearings supporting it, a bevel or other wheel $h$ is keyed, which gears with another or smaller wheel $i$, secured to the end of a feed-shaft $j$, which runs at right angles with the main driving-shaft $g$, the feed-shaft being supported in bearings fixed on the end of the bed-plate. I provide this feed-shaft $j$ with a worm or thread $k$ to gear with the teeth of a worm-wheel $l$, carried on a stud $m$, mounted in a continuation of the journal of the feed-screw $c$. On the same stud $m$ as the worm-wheel an ordinary spur or change wheel $n$ is placed. These two wheels revolve together, the spur-wheel being actuated by the first wheel and worm. The spur or change wheel $n$ gears into another intermediate spur or change wheel $o$, revolving on a stud $p$, adjustable in a slotted quadrant $q$, Fig. 6, carried and capable of being fixed by a nut and bolt $r$ in position upon the journal of the feed-screw $c$, and this second spur-wheel $o$ gears into a third change-wheel $s$, fixed on the end of the feed-screw. I also place on the main driving-shaft $g$ a sliding carriage-bracket $t$, carrying a bevel gearing-wheel $u$. This bevel-wheel $u$ has a key fitted into it, which slides along the groove in the main driving-shaft $g$ as it revolves, while the bevel-wheel $u$ slides on the surface of the shaft $g$ as the main part of the machinery traverses the bed. The bevel-wheel $u$ gears with another bevel-wheel $v$, attached to an ordinary spur-wheel $w$, revolving on a stud fitted into the end of the movable carriage $d$, the sliding carriage-bracket $t$ also being bolted onto the movable carriage $d$. This spur-wheel $w$ being actuated by the main driving-shaft and bevel-wheels acts in turn upon two other spur-wheels $x$ and $y$, the one, $x$, keyed onto the hammer-driving shaft $z$ and the other, $y$, onto the chisel-driving shaft 2.

On the hammer-driving shaft $z$ I secure a cam 3, which in revolving raises the hammer $e$ and allows it to fall by gravity; but to insure a quick return with sufficient force I also increase the effect by means of a powerful spring 4, coiled about the hammer pivot-pin, one end resting on the hammer-haft and the other on the abutment 5, which is raised preferably to increase the tension or pressure of the spring by means of an adjustable telescoping rod 6, having below at the foot of its lower section a wheel 7, allowed to run on a shaped plate or rail 8, corresponding to the taper of the file which is being cut. This telescoping rod is shown in detail in Figs. 11 and 12. The sleeve 32, which is threaded on its exterior, is placed over the rod 6 and screwed into a threaded socket at one end of the abutment 5, and as it is screwed through the socket the bottom end of the sleeve presses on a washer or collar 30 on the rod 6, thus forcing the abutment 5 and tail end of the spring 4 upward, causing the other end of the spring to press heavily on the hammer-haft 9. As the rod 6, with the wheel 7, is moved forward on the tapered plate 8 it rises through the hole or socket in the hammer pivot-support 31, lifting the abutment 5, end of spring 4, and sleeve 32 with it, and even while this action is proceeding the pressure can be still further increased or adjusted by turning the hand-wheel 33 without affecting the rod 6.

The chisel-shaft 2 I arrange below and actuate it by the main driving-shaft $g$, as aforesaid, and cause it to revolve a cam 10, which raises the chisel $f$ clear of the cut just as the feed-forward motion is effected and allows the chisel $f$ to come back and rest on the file just before the hammer strikes the head of the chisel. This motion is obtained, preferably, by the cam 10 pressing a horizontal slide 11, having two friction-rollers 12 13, the cam 10 pressing against one roller 12 and causing the other roller 13 to press against an oblique tappet or inclined plane 14, thus raising the chisel. The inclined plane or slope 14 is adjustable by a screw 56 and wedge 57 or otherwise on the frame of the chisel-motion, so that a higher or lower lift can be given, as desired, even while in motion. The wedge 57 (see Figs. 4 and 5) acts on a pin or projection 58 on the edge of the plane 14, so as to set the same according to the required lift of the chisel. I am also able to adapt the chisel and carrier to a thick or thin file or to a file lying on a high or low bed. The chisel-holder is carried by a yoke 15, bolted to a frame or cross-head 16, having four slides 17, Figs. 3, 4, and 5, moving in guides in the frame of the movable carriage $d$, the chisel-holder being so arranged as to be adjustable in two ways. I adjust the horizontal angle by placing the yoke 15 on two slotted bars 18, holding it thereon by means of two screws or nuts and bolts through these slotted bars, so that its angle can thus be adjusted so as to cut parallel or obliquely in either direction. The chisel-carrier 19, in which the actual chisel-holder 20, Figs. 16 and 17, is placed, has a cylindrical or other suitably-shaped shank 21 fitting into a corresponding hole or socket 22 in the yoke 15 and may be secured by a set-screw or the like. The chisel can thus be put at any required angle to the perpendicular. In order to cut at a very oblique angle to the horizontal, the socket on the yoke can be placed at an angle also, as shown at Fig. 15.

The actual chisel-holder 20 I make of a piece of metal having a slot or groove 23 for the chisel. This holder has two hollow cone-shaped trunnions, one on each side, which fit into cone-shaped or tapered bearings in the carrier 19, the carrier being in two parts (one of which is a face-plate 24) held together by bolts or screws for allowing the bearings on the trunnions to be adjusted. Both the hollow trunnions are preferably tapped, so that a set-screw 25 may be used on either side for securing the chisel in the slot or groove 23. This arrangement gives the chisel an oscillating movement, so as to allow the blade of the chisel to adapt itself to flat or beveled surfaces and to the surfaces or ridges of two separate files at the same time, such as the edges of three square files or the annular surface of round or half-round files. By this arrangement the chisel can readily be taken out to be resharpened. The horizontal slide in the chisel-motion is acted upon by springs 26 to bring the slide back to its normal position.

The slide for the hammer-motion consists of a cross-head 27, sliding in vertical guides in the frame of the movable part $d$ of the machine. I prefer to make the cross-head to work in a single slide, as shown; but a double slide might be used. In the form shown in the drawings the cross-head slide is adjustably secured in a quadrant 53, which enables the hammer to be moved up and down in the same direction as the angle to the perpendicular at which the chisel is placed. In the center of the cross-head a friction-roller 28 is placed. The cam 3 on the hammer-driving shaft $z$ in revolving presses against this roller, forcing the sliding cross-head upward, thus lifting the hammer, the hammer-haft 9 being supported near the hammer-head in a link or bridle 29, suspended from this cross-head 27, and the link or bridle being held by nuts and screws to render it adjustable to suit files of different thicknesses and to alter the length of the stroke of the hammer. The force of the blow of the hammer can also be altered by using a larger or smaller cam 3, thus lengthening or shortening the lift, also by using a larger or smaller hammer $e$, also by means of a screwing telescopic arrangement on the vertical rod 6 supporting the abutment of the spring and having the wheel at the foot traveling with the carriage, as hereinbefore described. This screwing telescopic arrangement is preferably actuated by a hand-wheel 33.

To assist in holding the file still on the bed, a vertical rod 34 is used, fitting in lugs fixed in the frame of the moving carriage and having a projecting finger or socket 35, on or in which is placed a shank 37, carrying a presser-like blade 45 at the end, the presser 45 bearing on the files in front of the chisel and the pressure being varied by means of an adjustable coiled spring 36 on the rod. This presser (shown in detail in Fig. 10) is made so as to adapt itself to flat or beveled surfaces as readily as the chisel does. This is done by the shank 37 carrying the presser being in two parts, the one socketed into the other and capable of rotation therein. When the chisel has to be raised in order to take away the file which has been cut and to place another on the bed, a lever 38, Fig. 3, which opens the clutch-box for the carriage to be put back, presses against a rod 39, one end of which presses against the horizontal slide 11 (see also Fig. 4) in the chisel-motion, thus by means of the oblique tappet or inclined plane 14 lifting the chisel-motion and raising the chisel off the file and further raising the presser by a projecting nib 40 or finger on the frame of the chisel-motion contacting with another corresponding nib or finger 41 on the vertical rod 34, carrying the presser, Figs. 1 and 2. This lever will open the clutch-box, free the screw, and lift the chisel and presser off the file simultaneously, thus allowing the file to be taken out and the carriage to be put back to start afresh. Separate levers may also be used, such as the lever 42, which has a pin 43 engaging with the chisel-motion, thereby allowing the same to be raised even when the machine is in motion.

The bed of soft metal, such as pewter, on which the file rests while being cut, is placed on a fixed block 46, between the rods 47, hereinafter described; but the file-bed is made movable from side to side as may be required to assist the chisel in adapting itself to flat surfaces, also to enable the operator to bring the surface of a round or half-round file under different parts of the cutting edge of the chisel without having to take the chisel out and place it in another position for the same purpose as is done in some other file cutting-machines.

The movement for shifting the file-bed sidewise is effected by means of a frame fitted on the anvil or block 46, Figs. 1, 2, and 3, and which is made to slide on the face of the anvil. The frame consists of two bars or rods 46 47, Fig. 3, lying longitudinally on the anvil and secured at each end to a cross-plate by means of set-screws. At each end of the anvil an adjustable block 53 is placed on a center pin or pillar 54 and can be held at any angle by means of a set-screw 55, holding it (the block) to its own pin supporting it. On one side of the anvil a rod or shaft 48 is supported near each end in lugs fixed in the anvil. Gearing-wheels 49 are secured to the shaft, and these wheels gear into two others, 49, which are fixed in sockets in the side of the anvil and attached each to a screw 50, having an elbow-joint which fits into a slot in a corresponding position in the near bar 47 of the longitudinal frame on the face of the anvil. The rod or shaft 48 is turned around in either direction by an attached hand-wheel or a loose key for the convenience of the operator. By turning the shaft the bevel-wheels act upon the screws with the elbow-joints and pull or push the sliding frame 47 from side to side and moving the file-bed with it as may be required, there being sufficient margin on the face of the anvil on either side of the frame. When cutting at an oblique angle, the frame can be set at a corresponding angle by releasing the set-screws 55 and setting the block 53 at each end of the anvil askew, forcing the frame to the required angle, so that when the bed is moved from side to side it will move in the same direction as the angle of the chisel, obviating the danger of making cross-teeth if moved while the machine is in motion. The chisel when cutting the surfaces of files in courses, such as round or half-round singly, will be held rigidly in the holder, as shown in Fig. 15.

I adjust the surfaces of half-round files for cutting in one method by means of a worm 51 and wheel 52, Figs. 7, 8, and 9, so that the bed may be revolved through the required angle. In order to cut the surfaces of half-round files, I remove the aforementioned bed of soft metal from the anvil 46 and place thereon a loose brass casting having a concave bed $44^a$, Fig. 9, in which rotates a steel or iron bed having a convex bottom $44^b$, Fig. 9, to fit the concave bed $44^a$, there being in the steel or iron bed $44^b$ a square groove or channel cut, in which I place the file-bed 44, of soft metal, the whole of this arrangement in block being moved from side to side when necessary to bring the different courses to be cut under the blade of the chisel, as is any other bed when placed on the anvil 46 between the bars 47. The bed $44^b$ is made to revolve when required by means of the worm 51 and wheel 52.

I may dispense with the presser for holding the file down on the bed in cases where the files are left uncut at the points, and the file can then be held in position by means of the ordinary leather stirrup, as used in hand-cutting operations.

I do not limit the application of my invention to the special means for raising and lowering the lift of the chisel while in motion or at rest, as hereinbefore described, but I may vary the same to suit the size of the machine to be produced and the size or form of the file or rasp to be operated upon. Similarly, I vary the form of gearing and the means employed for securing the proper sequence of the different parts of the machine to suit any particular requirements.

Having now described my invention, what I claim as new, and desire to secure by Letters Patent, is—

1. In a file or rasp cutting machine comprising in combination, a stationary bed-plate, a blank-support or anvil thereon and a traveling carriage bearing the tool and hammer, means for traveling said carriage at variable predetermined speeds consisting of a leading-screw and a power-shaft both mounted on the bed-plate, and differential gearing comprising a worm-shaft and worm-wheel, the former driven through bevel-gear by the power-shaft and the latter driving the leading-screw through a set of three change-wheels, substantially as hereinbefore described.

2. In a file or rasp cutting machine comprising in combination, a stationary bed-plate, a blank-support or anvil thereon, and a traveling carriage for bearing the tool and hammer, means for reciprocating the tool, consisting of a tool-holder mounted in a cross-head sliding in guides in the carriage, a horizontal slide in contact with an inclined plane or wedge on the cross-head and with a cam on a shaft mounted in the carriage and driven from the main or power shaft substantially as hereinbefore described.

3. In a file or rasp cutting machine comprising a stationary bed-plate, a blank-support or anvil thereon and a traveling carriage bearing the tool and hammer, a tool-holder consisting of a slotted block fitted with trunnions and set-screws and pivoted within a carrier clamped in a yoke bolted to a cross-head, both the yoke and cross-head being slotted to allow the former to be adjusted and set to a suitable angle according to the quality of cut required, substantially as hereinbefore described.

4. In a file or rasp cutting machine comprising a stationary bed-plate, a blank-support or anvil thereon and a traveling carriage bearing the tool and hammer, means for adjusting the lift of the tool consisting of a tool-holder secured to a cross-head sliding in guides in the traveling carriage, an inclined plane or wedge mounted in guides in said cross-head, an adjusting-wedge in contact with a pin on the upper edge of the inclined plane and set to the required position by a screw, a horizontal slide in contact with the inclined plane, guide-rods and springs for the slide, and a cam in contact with the slide and carried by a shaft driven from the main power-shaft substantially as hereinbefore described.

5. In a file or rasp cutting machine comprising in combination a stationary bed-plate, a blank-support or anvil thereon and a traveling carriage bearing the tool and hammer, means for operating the hammer, consisting of a cross-head sliding in guides in the traveling carriage above the tool-holder and connected to the hammer-haft by a link or bridle and a cam in contact with a roller on the cross-head and carried by a shaft mounted in the carriage and driven by the main driving-shaft of the machine through bevel and spur gear substantially as hereinbefore described.

6. In a file or rasp cutting machine comprising in combination a stationary bed-plate, a blank-support or anvil thereon and a traveling carriage bearing the tool and hammer, means for adjusting the blow of the hammer and regulating the same according to the tapering thickness of the file-blank, consisting of a spring coiled about the hammer pivot-pin and having one end pressed on the hammer-haft and the other on an abutment, a sleeve screwed through said abutment against a collar on a rod passing through said sleeve and extended downwardly, and a roller on the end of said rod in contact with a templet corresponding to the taper of the file and placed in a groove in the bed-plate of the machine substantially as described.

7. In a file or rasp cutting machine comprising in combination a stationary bed-plate, a blank-support or anvil thereon, and a traveling carriage bearing the tool and hammer, means for firmly holding the blank upon its bed, consisting of a blade-like presser with cylindrical shank fitting a correspondingly-recessed socket, a vertical rod carrying said socket, a compression-spring and adjusting-nut thereon and a hand-lever engaging with a pin on said rod for the purpose of freeing the blank when required substantially as described.

8. In a file or rasp cutting machine comprising in combination a stationary bed-plate, a blank-support or anvil thereon and a traveling carriage bearing the tool and hammer, means for raising the tool from the blank and at the same time releasing the blank after stopping the carriage, consisting of a clutch-box on said carriage, a lever for operating same, a push-rod having one end pressed by the lever and the other in contact with a horizontal slide pressing against an inclined plane or wedge on the cross-head carrying the tool-holder and a pin on the cross-head engaging with a pin on a vertical rod carrying the presser, substantially as hereinbefore described.

9. In a file or rasp cutting machine comprising in combination a stationary bed-plate, a blank-support or anvil thereon and a traveling carriage bearing the tool and hammer, means for raising the tool, consisting of a hand-lever pivoted on the traveling carriage, a pin thereon in contact with a pin on the cross-head carrying the tool-holder and a third pin in contact with the cross-head pin and carried by a vertical rod carrying the presser substantially as hereinbefore described.

10. In a file or rasp cutting machine comprising in combination a stationary bed-plate, a blank-support or anvil thereon and a traveling carriage bearing the tool and hammer, means for holding the blank-bed in any required position, consisting of two parallel bars having their ends loosely pinned in two slotted blocks pivoted on pins on the anvil and secured by set-screws, and two shifting-screws geared by bevel-wheels to a single hand-operating spindle substantially as hereinbefore described.

In witness whereof I have hereunto set my hand in presence of two witnesses.

JOHN GREENE.

Witnesses:
THOMAS DWERRYHOUSE,
F. A. FROST.